(12) United States Patent
Kuboyama et al.

(10) Patent No.: US 11,628,501 B2
(45) Date of Patent: Apr. 18, 2023

(54) COMPOSITE PARTICLES AND METHOD FOR PRODUCING COMPOSITE PARTICLES

(71) Applicant: TOYOTA JIDOSHA KABUSHIKI KAISHA, Toyota (JP)

(72) Inventors: Daiki Kuboyama, Toyota (JP); Akira Kato, Toyota (JP); Jyunya Murai, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/114,593

(22) Filed: Dec. 8, 2020

(65) Prior Publication Data

US 2021/0213530 A1 Jul. 15, 2021

(30) Foreign Application Priority Data

Jan. 14, 2020 (JP) .............................. JP2020-003609

(51) Int. Cl.
| | | |
|---|---|---|
| *B22F 1/05* | (2022.01) | |
| *B32B 5/22* | (2006.01) | |
| *B22F 9/24* | (2006.01) | |
| *B22F 7/02* | (2006.01) | |
| *B22F 1/054* | (2022.01) | |
| *B82Y 40/00* | (2011.01) | |
| *B82Y 30/00* | (2011.01) | |

(52) U.S. Cl.
CPC ............... *B22F 9/24* (2013.01); *B22F 1/054* (2022.01); *B22F 7/02* (2013.01); *B32B 5/22* (2013.01); *B22F 2304/054* (2013.01); *B22F 2304/10* (2013.01); *B22F 2999/00* (2013.01); *B82Y 30/00* (2013.01); *B82Y 40/00* (2013.01)

(58) Field of Classification Search
None
See application file for complete search history.

(56) References Cited

U.S. PATENT DOCUMENTS

| | | | |
|---|---|---|---|
| 2004/0112477 A1 | 6/2004 | Hattori et al. | |
| 2005/0183543 A1 | 8/2005 | Sasaki et al. | |
| 2015/0263192 A1* | 9/2015 | Muschelknautz | ............................ H01L 31/022425 252/514 |
| 2015/0337423 A1* | 11/2015 | Martin | ............. B22F 1/056 75/252 |
| 2016/0339517 A1* | 11/2016 | Joshi | ............. B22F 1/17 |
| 2018/0214949 A1* | 8/2018 | Martin | ............. B22F 10/20 |
| 2018/0236536 A1 | 8/2018 | Murai et al. | |
| 2019/0193151 A1* | 6/2019 | Okumura | ............. B22F 1/142 |
| 2019/0344354 A1 | 11/2019 | Murata et al. | |

FOREIGN PATENT DOCUMENTS

| | | |
|---|---|---|
| JP | 2004124257 A | 4/2004 |
| JP | 2005060831 A | 3/2005 |
| JP | 2005146408 A | 6/2005 |

(Continued)

*Primary Examiner* — George Wyszomierski
(74) *Attorney, Agent, or Firm* — Dickinson Wright, PLLC

(57) ABSTRACT

Composite particles sinterable at a low temperature and allow forming a sintered body that exhibits a large extension are provided. The composite particles include microparticles having an average crystallite diameter of 0.6 to 10 μm and containing a metal, and nanoparticles adhered to a surface of the microparticle, having an average crystallite diameter of 3 to 100 nm, and containing a metal of a same kind as the metal contained in the microparticle.

4 Claims, 11 Drawing Sheets

(56) References Cited

FOREIGN PATENT DOCUMENTS

| | | | |
|---|---|---|---|
| JP | 2006339057 | A | 12/2006 |
| JP | 2007080635 | A | 3/2007 |
| JP | 2016008337 | A | 1/2016 |
| JP | 2016096031 | A | 5/2016 |
| JP | 2018135566 | A | 8/2018 |
| WO | 2009116349 | A1 | 9/2009 |
| WO | 2018142943 | A1 | 8/2018 |

* cited by examiner

COMPOSITE PARTICLES AND METHOD FOR PRODUCING COMPOSITE PARTICLES

CROSS REFERENCE TO RELATED APPLICATIONS

The present application claims priority from Japanese patent application JP 2020-003609 filed on Jan. 14, 2020, the entire content of which is hereby incorporated by reference into this application.

BACKGROUND

Technical Field

The present disclosure relates to composite particles, and a method for producing the composite particles.

Background Art

For a metal paste containing metal particles, there are various kinds of usages, such as a wiring circuit for printed wiring board, a filler for via hole, and a bonding agent for element mounting. In order to lower the resistance of a wiring circuit, a via-wiring, a bonding agent layer, and the like formed of the metal paste, it is required that the metal paste be sintered to exhibit high conductivity.

JP 2005-146408 A discloses a fine-silver-particles adhered silver powder, in which fine silver particles are adhered to a surface of a core silver powder, as a silver powder sinterable at a low temperature.

JP 2016-008337 A discloses a method for producing core-shell type metal microparticles used for a conductive ink, the core-shell type metal microparticles being formed of core components containing copper and shell components containing silver.

JP 2016-096031 A discloses silver coated particles contained in, for example, a conductive paste and an anisotropic conductive material as a conductive filler. The silver coated particles have a structure in which surfaces of mother particles are coated with silver.

SUMMARY

The metal paste used as a bonding agent for element mounting is required to be able to be sintered at a low temperature. In order to reduce stress caused by thermal expansion of the element, it is also required that a sintered body of the metal paste exhibit a large extension (i.e., a large elongation).

The silver powder disclosed in JP 2005-146408 A has the core silver powder whose crystallite diameter is small. According to an examination by the inventors, a sintered body of the silver powder disclosed in JP 2005-146408 A has a small crystallite diameter, and therefore, does not exhibit a sufficient extension. The metal microparticles obtained by the producing method disclosed in JP 2016-008337 A have different metal species between the core component and the shell component. A sintered body of such metal microparticles contains alloy, thereby being fragile. Therefore, these metal microparticles are not appropriate for being used as the bonding agent. The silver coated particles disclosed in JP 2016-096031 A are not appropriate for being used as the bonding agent because they are not sufficiently sintered at a low temperature according to the examination by the inventors.

Therefore, the present disclosure provides composite particles that are sinterable at a low temperature and allow forming a sintered body that exhibits a large extension. The present disclosure also provides a simple method for producing such composite particles.

According to a first aspect of the present disclosure, there is provided composite particles that comprise microparticles and nanoparticles. The microparticles have an average crystallite diameter of 0.6 to 10 µm. The microparticle contains a metal. The nanoparticles are adhered to a surface of the microparticle. The nanoparticles have an average crystallite diameter of 3 to 100 nm. The nanoparticles contains a metal of a same kind as the metal contained in the microparticle.

According to a second aspect of the present disclosure, there is provided a method for producing the composite particles of the first aspect. The method comprises preparing a dispersion liquid of nanoparticles having an average particle diameter of 3 to 100 nm, the nanoparticle containing a metal, the dispersion liquid having a solid content concentration of 1 to 80 wt %, and mixing the dispersion liquid and microparticles having an average crystallite diameter of 0.6 to 10 µm to obtain a mixed liquid, the microparticle containing a metal of a same kind as the metal contained in the nanoparticle. The mixed liquid has a weight ratio of the nanoparticle and the microparticle of $10^3:1$ to $10^6:1$.

The composite particles of the present disclosure are sinterable at a low temperature, and its sintered body exhibits a large extension. The producing method of the present disclosure allows easy production of the composite particles that exhibit a large extension.

DETAILED DESCRIPTION (1) Composite Particles

Figure 1:
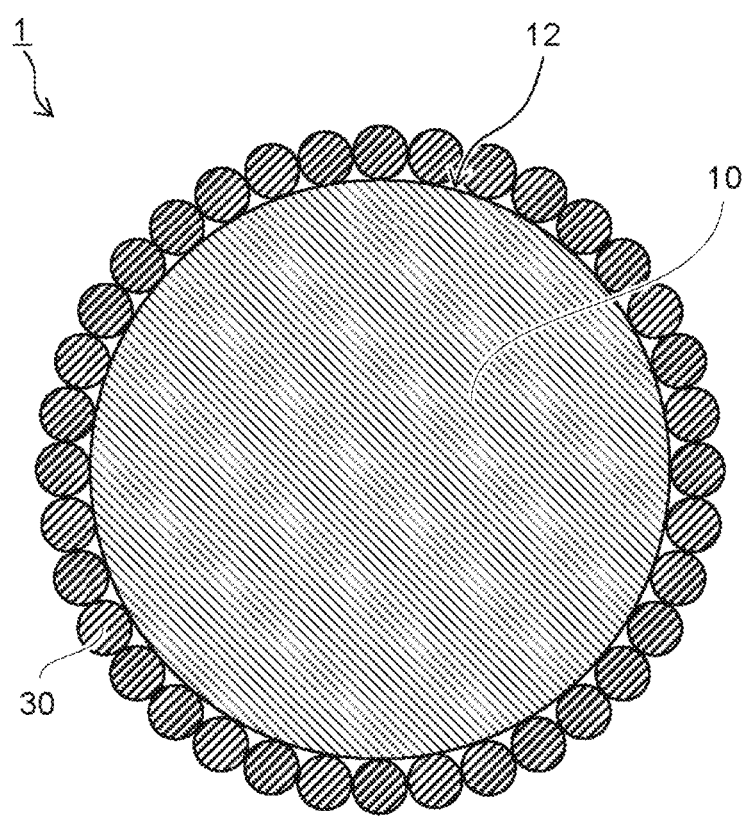
FIG. 1 is a drawing illustrating an exemplary schematic cross-sectional view of a composite particle according to an embodiment.

As illustrated in FIGS. 1 to 4, a composite particle 1 according to the embodiment includes a microparticle 10 and nanoparticles 30. The composite particle 1 may further include a protective layer (not illustrated) that coats a surface of the nanoparticle 30.

In the present application, the microparticle 10 is defined as a particle having a particle diameter within a range of 0.6 to 10 μm, and the nanoparticle 30 is defined as a particle having a particle diameter within a range of 3 to 100 nm. Here, the particle diameter means a projected area circle equivalent diameter (a diameter of a circle having an area equivalent to the projected area of the particle) obtained from a scanning electron microscope (SEM) image or a transmission electron microscope (TEM) image.

The microparticle 10 contains a metal, and the microparticle 10 may be formed of a metal and inevitable impurities in some embodiments. Example of the metal species include, for example, Ag, Al, Si, Ti, Cr, Mn, Fe, Ni, Cu, Zn, Zr, Nb, Mo, In, and Co.

The microparticle 10 is a single crystal or polycrystalline particle and has an average crystallite diameter of 0.6 to 10 μm. In the present application, the average crystallite diameter of the microparticle 10 is obtained as follows. Using the SEM, an electron backscatter diffraction (EBSD) measurement of cross-sectional surfaces of a plurality of the composite particles 1 is performed to obtain a crystal orientation map (an inverse pole figure map). The crystal orientation map shows respective crystallites, which are color coded. Projected area circle equivalent diameters of the crystallites in randomly selected 50 or more microparticles 10 are obtained, their sum is divided by the number of the selected crystallites. Thus, the average crystallite diameter of the microparticles 10 can be obtained.

The microparticle 10 having the average crystallite diameter of 0.6 to 10 μm allows that a sintered body obtained by sintering the composite particles 1 at a temperature equal to or less than 300° C., and at a temperature equal to or less than 250° C. in some embodiments, to have an average crystallite diameter of 0.6 μm or more. Such a sintered body exhibits a large extension as described later. The inventors have confirmed that, when the microparticles have an average crystallite diameter up to 10 μm maximum, a sintered body that exhibits a large extension can be obtained by sintering at a temperature equal to or less than 300° C., and at a temperature equal to or less than 250° C. in some embodiments.

Figure 2:
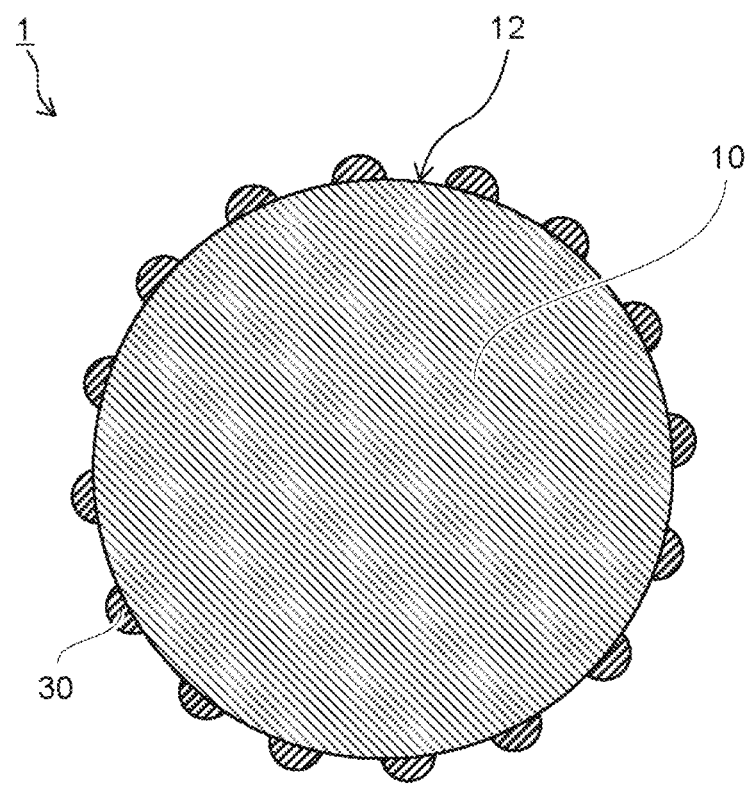
FIG. 2 is a drawing illustrating an exemplary schematic cross-sectional view of the composite particle according to the embodiment.
Figure 3:
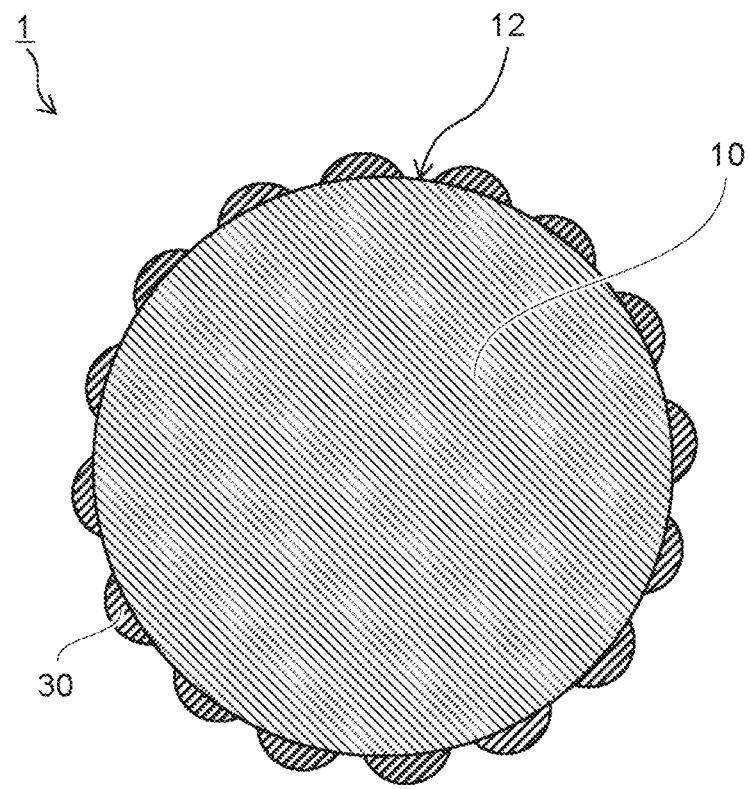
FIG. 3 is a drawing illustrating an exemplary schematic cross-sectional view of the composite particle according to the embodiment.
Figure 4:
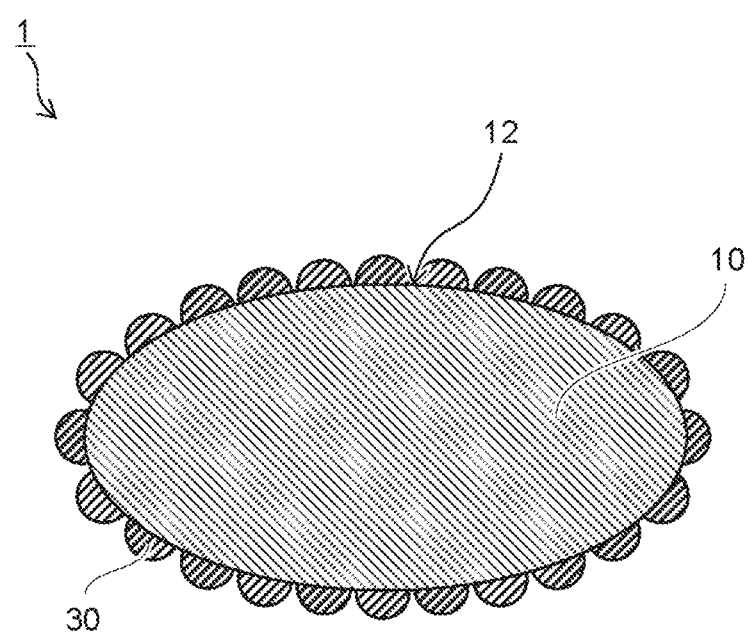
FIG. 4 is a drawing illustrating an exemplary schematic cross-sectional view of the composite particle according to the embodiment.

The shape of the microparticle 10 is not specifically limited. For example, the microparticle 10 may be a spherical particle as illustrated in FIGS. 1 to 3, may be a particle in a spheroid shape, such as a prolate spheroid shape and an oblate spheroid shape, as illustrated in FIG. 4, or may be a plate-shaped particle.

A plurality of the nanoparticles 30 are adhered to a surface 12 of the microparticle 10. When the composite particle 1 includes the protective layers coating the surfaces of the nanoparticles 30, the plurality of nanoparticles 30 are indirectly adhered to the surface 12 of the microparticle 10 via the protective layers.

The nanoparticle 30 contains a metal of the same kind as the metal contained in the microparticle, and the nanoparticle 30 may be formed of a metal of the same kind as the metal contained in the microparticle and inevitable impurities in some embodiments.

The nanoparticles 30 have an average particle diameter of 3 to 100 nm, and the nanoparticles 30 may have an average particle diameter of 3 to 70 nm in some embodiments. In the present application, the average particle diameter of the nanoparticles 30 can be obtained by obtaining projected area circle equivalent diameters of 50 or more nanoparticles 30 randomly selected from the SEM image or the TEM image of the composite particle 1 and dividing their sum by the number of the nanoparticles 30. The average particle diameter of the nanoparticles 30 being 100 nm or less, which may be 70 nm or less in some embodiments, lowers a melting point of the nanoparticles 30. Thus, it is possible to sinter the composite particle 1 at a temperature equal to or less than 300° C., which is a bonding temperature of a solder used as the bonding agent in the related art, and it may be possible to sinter the composite particle 1 at a temperature equal to or less than 250° C. in some embodiments. The average particle diameter of the nanoparticles 30 being 3 nm or more can hinder the nanoparticles 30 from being sintered at room temperature, thereby giving the composite particle 1 high preservation stability.

The shape of the nanoparticle 30 is not specifically limited. For example, the nanoparticle 30 may be a spherical particle as illustrated in FIG. 1, may be a hemispherical particle as illustrated in FIGS. 2 to 4, may be a plate-shaped particle, or may be a nanowire-shaped particle. When the nanoparticle 30 is a spherical particle, or a plate-shaped particle having two or less aspect ratio, the composite particle 1 can have a larger specific surface area and cause the nanoparticles 30 to densely adhered to the surface 12 of the microparticle 10. This allows sintering the composite particle 1 at a lower temperature.

A crystal orientation of the nanoparticle 30 may be different from a crystal orientation of the microparticle 10. This allows the nanoparticle 30 to have a low melting point and allows sintering the composite particle 1 at a temperature equal to or less than 300° C., and the composite particle 1 may be sintered at equal to or less than 250° C. in some embodiments.

The protective layer (not illustrated) of the nanoparticle 30 is a layer of organic molecules having unshared electron pairs. A high molecule having the unshared electron pairs adsorbs to the nanoparticle 30. Examples of high molecules include polyvinylpyrrolidone (polyvinylpyrrolidone copolymer, PVP), cetyltrimethylammonium bromide, octylamine, nonylamine, decylamine, diethanolamine, butanoic acid, isobutyric acid, octanoic acid, and 2-ethylhexanoic acid. The PVP may have a weight average molecular weight of 4000 to 360000. This allows the protective layers to melt at a sintering temperature of the composite particle 1, and thus, sintering of the composite particle 1 is not interfered by the protective layers.

When the composite particles 1 are heated, atoms diffuse in interfaces between the composite particles 1 in contact with one another, and the composite particles 1 are sintered. That is, sintering of the composite particles 1 occurs on the surfaces of the composite particles 1. Therefore, the larger the specific surface area of the composite particle 1, the lower the temperature at which the composite particle 1 can be sintered. The composite particle 1 may have a specific surface area of 1.2 $cm^{-1}$ or more. This allows sintering the composite particle 1 at a temperature equal to or less than 250° C. The composite particle 1 may have a specific surface area equal to or less than 2000 $cm^{-1}$. This can hinder the composite particle 1 from being sintered at room temperature, thereby giving the composite particle 1 high preservation stability.

In the composite particle 1 according to the embodiment, the nanoparticle 30 has a melting point lower than that of the microparticle 10 due to its small particle diameter. Therefore, the nanoparticle 30 is sintered at a temperature lower than the microparticle 10. When the composite particle 1 according to the embodiment is heated at a temperature equal to or less than 300° C., and at a temperature equal to or less than 250° C. in some embodiments, sintering occurs between the nanoparticles 30 within one composite particle 1 and between the nanoparticles 30 of the neighboring composite particles 1.

The metal paste containing only metallic nanoparticles can also be sintered at a low temperature. However, according to the inventors, the sintered body obtained by sintering such a metal paste at a low temperature cannot have a large crystallite diameter (for example, a crystallite diameter of 0.6 μm or more). The following describes the reason.

When the metal paste is sintered, crystallites coarsen by Ostwald ripening. The Ostwald ripening is represented by the following formula (1).

$$\langle R \rangle^3 - \langle R \rangle_0^3 = \frac{8D\gamma V_m}{9R_g T} t \quad (1)$$

In the formula (1), <R> represents an average radius of whole crystallites, <R>$_0$ represents an average radius of the whole crystallites before sintering, that is, at a start of the Ostwald ripening, D represents a diffusion coefficient of a particle material, γ represents a surface tension or surface energy of the particle, $V_m$ represents a molar volume of the particle material, $R_g$ represents a gas constant, T represents an absolute temperature, and t represents a time.

Figure 5:
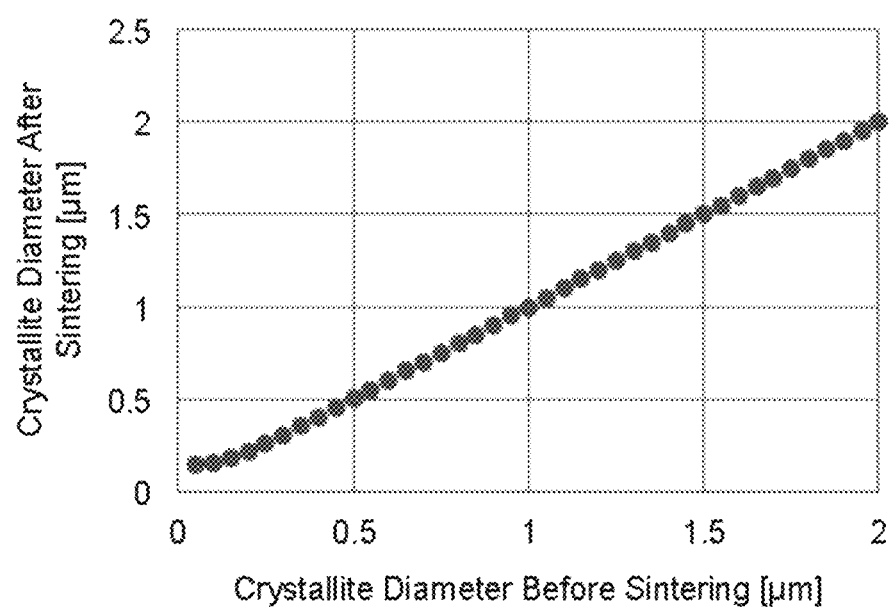
FIG. 5 is a drawing illustrating a result of calculating an average crystallite diameter of a sintered body based on a formula of Ostwald ripening.

FIG. 5 illustrates a result of calculating the average crystallite diameter of the sintered body obtained by sintering at 250° C. based on the formula (1).

According to FIG. 5, when the crystallite diameter before sintering is approximately 200 nm or less, the sintered body has a crystallite diameter larger than the crystallite diameter before sintering due to the Ostwald ripening. However, the crystallite diameter of the sintered body obtained in this case is approximately 100 to 200 nm. This indicates that even though the metal paste containing only the metallic nanoparticles with the crystallite diameter of 200 nm or less is sintered at a low temperature, the sintered body having a large crystallite diameter (for example, a crystallite diameter of 0.6 μm or more) cannot be obtained. For example, the silver powder disclosed in JP 2005-146408 A includes the core silver powder having a crystallite diameter of 10 nm or less. It is estimated that a sintered body obtained by sintering this silver powder at 250° C. has a crystallite diameter of approximately 100 to 200 nm.

Meanwhile, according to FIG. 5, when the crystallite diameter before sintering is more than 200 nm, especially, when it is 0.6 μm or more, the sintered body has a crystallite diameter substantially equal to the crystallite diameter before sintering. That is, the Ostwald ripening of the crystallite hardly occurs. Accordingly, in order to obtain the sintered body having a crystallite diameter of 0.6 μm or more, it is necessary to sinter a particle having a crystallite diameter of 0.6 μm or more. The composite particle 1 according to the embodiment includes the microparticle having the average crystallite diameter of 0.6 μm or more. Therefore, the sintered body obtained by sintering the composite particle 1 has the average crystallite diameter of 0.6 μm or more. As indicated in reference examples 1 to 3 described later, the inventors have found that the sintered body exhibits an increased extension (i.e., elongation) when the sintered body has an increased average crystallite diameter. The sintered body having the average crystallite diameter of 0.6 μm or more exhibits a sufficient extension. Accordingly, the composite particle 1 according to the embodiment can be used for the metal paste for a bonding agent for element mounting in some embodiments.

(2) Method for Producing Composite Particles

The composite particle 1 may be produced in any producing method without a specific limitation. For example, nanoparticles can be formed on a surface of a microparticle by sputtering a metal on the surface of the microparticle. The method according to the embodiment described below is also an exemplary method for producing the composite particle 1. This method does not use an expensive vacuum unit, and therefore, the composite particle 1 can be easily produced at low cost.

Figure 6:
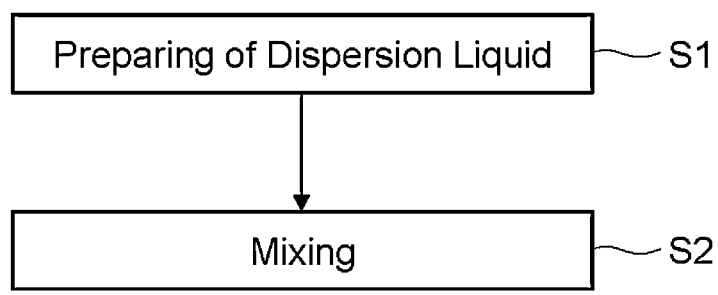
FIG. 6 is a flowchart of a method for producing the composite particles according to the embodiment.

The method for producing the composite particle according to the embodiment includes preparing a dispersion liquid of nanoparticles (S1) and mixing the dispersion liquid and the microparticles (S2) as illustrated in FIG. 6.

i) Preparation of Dispersion Liquid (S1)

First, the dispersion liquid of nanoparticles is prepared. A description will be given with an exemplary case where silver nanoparticles are used as the nanoparticles below. The dispersion liquid of the silver nanoparticles can be prepared by a method similar to a method disclosed in JP 2018-135566 A. It is specifically prepared as follows.

First, a solution containing silver ions is prepared. Specifically, an inorganic silver salt that is ionized in a solvent is prepared, and this is ionized in the solvent to generate silver ions. For example, when the solvent is water, the inorganic silver salt may be silver nitrate, silver cyanide, silver acetate, and the like. From the aspect of availability, chemical stability, and the like, the silver nitrate may be used in some embodiments.

Next, a reductant that reduces the silver ions and a polymer adsorbent that adsorbs to the reduced silver are prepared. Specifically, the reductant may have a standard electrode potential within a range of 0.03 V to 0.8 V. When the standard electrode potential is 0.03 V or more, the silver nanoparticles having plate shapes are formed. Meanwhile, the reductant with the standard electrode potential exceeding 0.8 V does not function as a reductant and the silver cannot be deposited because the standard electrode potential of the silver is 0.8 V.

Examples of the reductant having the standard electrode potential within the range of 0.03 V to 0.8 V include citric acid (0.03 V), formalin (0.056 V), ascorbic acid (0.06 V), oxalic acid (0.49 V), and hydrogen peroxide (0.68 V). Note that the standard electrode potentials of the respective substances are shown in the parentheses.

As the polymer adsorbent, a PVP having a weight average molecular weight of 4000 to 360000 is prepared. The PVP adsorbs to a crystal face of the silver, the crystal face being perpendicular to a certain direction, and inhibits the growth of the silver in the direction. As the result, the silver grows anisotropically by the microwave irradiation described later, and the silver nanoparticles having plate shapes may be generated. The polyvinylpyrrolidone having the weight average molecular weight within the above-described range can be prepared by, for example, a typically known graft polymerization.

Next, the reductant and the polymer adsorbent are added into the solution containing the silver ions, and mixed to obtain a mixed liquid. The obtained mixed liquid is introduced into a microwave synthesizer. Specifically, the mixed liquid is introduced into a container through which the microwave can be transmitted. Next, a microwave oscillator irradiates the mixed liquid with the microwave. This causes the silver ions to turn into silver and to be deposited, thereby generating a dispersion liquid of silver nanoparticles coated with the PVP. The silver nanoparticles in the dispersion liquid may have shapes of plates.

In the dispersion liquid of nanoparticles prepared as described above, the nanoparticles have an average particle diameter of 3 to 100 nm. The silver nanoparticles having an average particle diameter of 3 nm or more exhibit satisfactory dispersibility.

The dispersion liquid has a solid content concentration of 1 to 80 wt %, and may have a solid content concentration of 5 to 60 wt % in some embodiments. Note that the solid content concentration here means a weight of nanoparticles in the dispersion liquid (a weight of PVP not included)/a weight of dispersion liquid. The solid content concentration being 1 wt % or more, and 5 wt % or more in some embodiments, causes a sufficient amount of the nanoparticles to adsorb to the microparticles when the microparticles are mixed in the dispersion liquid as described later. When the solid content concentration is 80 wt % or less, and 60 wt % or less in some embodiments, the dispersion liquid does not become pastelike. This facilitates separating the composite particles from the nanoparticles remained without adhering to the microparticles after generating the composite particles.

ii) Mixing of Dispersion Liquid and Microparticles

The microparticles are added in the dispersion liquid of nanoparticles and stirred to obtain the mixed liquid. The nanoparticles and the microparticles in the mixed liquid have a weight ratio of $10^3$:1 to $10^6$:1, and they may have a weight ratio of $10^5$:1 to $10^6$:1 in some embodiments. This causes the nanoparticles to adsorb to the microparticles to form the composite particles.

The mixed liquid containing the nanoparticles having a total weight equal to or less than $10^6$ times a total weight of the microparticles causes the mixed liquid to separate into an upper layer and a lower layer when the mixed liquid is left for a predetermined period, for example, one hour or more after stirring is stopped. The upper layer is a dispersion liquid of excess nanoparticles and the lower layer is a layer of precipitated composite particles. The composite particles can be easily collected from the lower layer.

The mixed liquid containing the nanoparticles having a total weight equal to or more than $10^3$ times a total weight of the microparticles, and equal to or more than $10^5$ times a total weight of the microparticles in some embodiments, causes each of the nanoparticles in the mixed liquid to adsorb to a surface of a single microparticle or otherwise to fail to adsorb to any microparticles. That is, adsorption of any nanoparticles to two or more microparticles is avoided. This eliminates or reduces association of the plurality of composite particles and formation of an aggregate, thereby facilitating the preparation of a paste containing the composite particles.

While the embodiment of the present disclosure has been described in detail above, the present disclosure is not limited thereto, and can be subjected to various kinds of changes in design without departing from the spirit and scope of the present disclosure described in the claims.

EXAMPLES

The following specifically describes the present disclosure with Examples, but the present disclosure is not limited to these examples.

Example 1

(1) Production of Composite Particles

Silver microparticles (HXR-Ag manufactured by Nippon Atomized Metal Powders Corporation) were prepared as the microparticles. Silver was sputtered on surfaces of the silver microparticles with a barrel type sputtering apparatus SP-163000D (manufactured by SANVAC CO., LTD.) to form silver nanoparticles, thereby obtaining composite particles made of the silver microparticles and the silver nanoparticles.

(2) Observation of Composite Particle Structure

Figure 7:
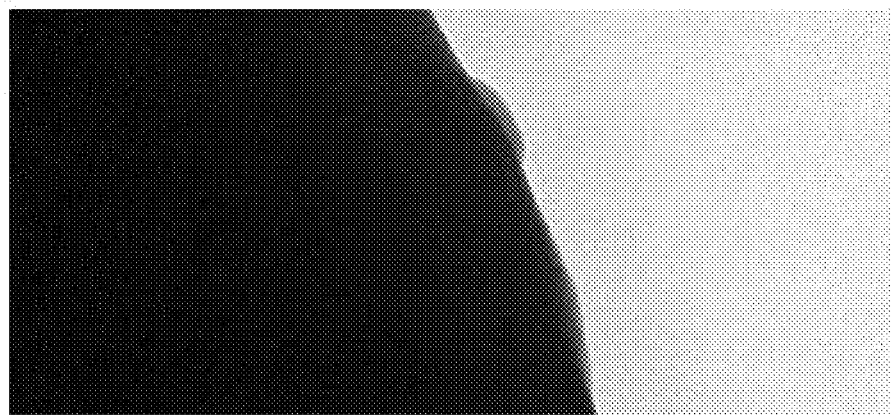
FIG. 7 is a TEM image of a composite particle in Example 1.

The obtained composite particles were observed by the TEM. FIG. 7 illustrates a TEM image of the composite particle. As illustrated in FIG. 7, a silver nanoparticle having an approximately hemispherical shape was formed on the surface of the silver microparticle.

Projected area circle equivalent diameters of randomly selected 50 silver microparticles were obtained from the TEM image, their sum was divided by the number of the selected particles, and thus, an average particle diameter of the silver microparticles was obtained. The average particle diameter of the silver microparticles was 2.3 µm.

Projected area circle equivalent diameters of randomly selected 50 silver nanoparticles were obtained from the TEM image, their sum was divided by the number of the selected particles, and thus, an average particle diameter of the silver nanoparticles was obtained. The average particle diameter of the silver nanoparticles was 10 nm as illustrated in Table 1.

A specific surface area of the composite particle was calculated from the average particle diameter of the silver microparticles and the average particle diameter of the silver nanoparticles. The calculation was performed by assuming that the silver microparticle was a spherical particle whose diameter was equal to the average particle diameter of the silver microparticles and that the silver nanoparticle was a hemispherical particle having a semicircular projected image whose area was equal to an area of a circle whose diameter was equal to the average particle diameter of the silver nanoparticles. The specific surface area was 260.9 $cm^{-1}$ as illustrated in Table 1.

An EBSD measurement of a cross-sectional surface of the composite particle was performed with the SEM, and a crystal orientation map was obtained. Projected area circle equivalent diameters of crystallites in randomly selected 50 silver microparticles were obtained from the crystal orientation map, their sum was divided by the number of the crystallites, and thus, an average crystallite diameter of the silver microparticles was obtained. The average crystallite diameter of the silver microparticles was 2.3 µm as illustrated in Table 1.

(3) Preparation of Paste

The composite particles and decanol were mixed in a proportion of 9:1 in weight ratio to obtain the mixture. The mixture was ground on a triple roll mill, thereby obtaining a silver paste with a solid content concentration of 90%.

(4) Observation of Sintered Body Structure

The silver paste was applied over a surface of a silver-plated copper plate to form a silver layer of 0.15 mm thickness. A test piece was manufactured by stacking a gold-plated copper block on the silver layer. The test piece was heated at 250° C. for 60 minutes in a nitrogen atmosphere to sinter the silver layer.

An EBSD measurement of a cross-sectional surface of the sintered silver layer was performed with the SEM, and a crystal orientation map was obtained. Projected area circle equivalent diameters of randomly selected 50 crystallites were obtained from the crystal orientation map, their sum was divided by the number of the selected crystallites, and thus, an average crystallite diameter of the sintered silver layer was obtained. The average crystallite diameter of the sintered silver layer was 2.27 μm as illustrated in Table 1.

(5) Measurement of Sintered Body Extension

The silver paste was applied over a polyimide tape to form a silver layer having a size of approximately 40 mm² and a thickness of 150 μm. The silver layer was sintered by heating at 250° C. for 60 minutes in a nitrogen atmosphere to sinter the silver layer. Afterwards, the polyimide tape was peeled off from the silver layer to obtain a specimen for extension measurement.

Using a linear servo micro load fatigue test system (manufactured by SAGINOMIYA SEISAKUSHO, INC., load capacity ±200 N), an extension (uniform extension) of the specimen was measured in the following conditions.

Test Speed: 2.0%/s

Test Control: Strain control (a strain was determined with a distance between chucks of 2 mm being used as a gauge length)

Test Temperature: Room temperature

The extension of the specimen was 19% as illustrated in Table 1.

Example 2

Composite particles were produced similarly to Example 1. The composite particles, silver particles with an average particle diameter of approximately 500 nm, and decanol were mixed in a proportion of 69:21:10 in weight ratio to prepare a mixture. The mixture was ground on the triple roll mill, thereby obtaining a silver paste.

Figure 8:
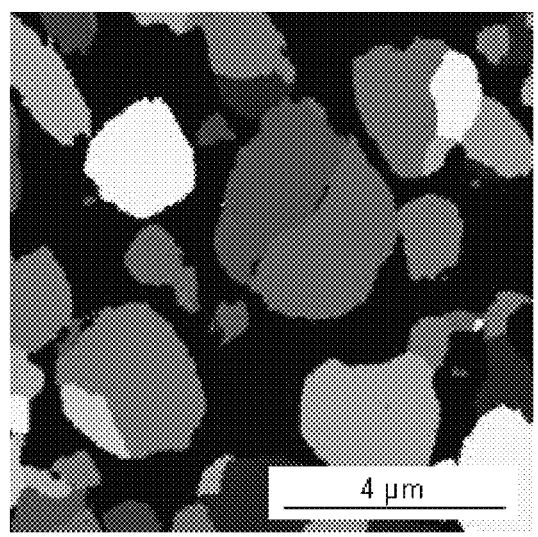
FIG. 8 is a crystal orientation map (an inverse pole figure map) obtained by an EBSD measurement of a sintered body in Example 2.

Similarly to Example 1, an EBSD measurement of a sintered body of the silver paste was performed, and a crystal orientation map illustrated in FIG. 8 was obtained. An average crystallite diameter of the sintered body was obtained similarly to Example 1 from the crystal orientation map. The average crystallite diameter was 1.76 μm as illustrated in Table 1.

Similarly to Example 1, an extension of the sintered body of the silver paste was measured. As illustrated in Table 1, the extension was 15%.

Example 3

(1) Production of Composite Particles

First, a dispersion liquid of silver nanoparticles was prepared as follows.

A mixed liquid was obtained by mixing silver nitrate and trisodium citrate with water as a solvent such that the mixture liquid had a concentration of the silver nitrate of 10 mM and a concentration of the trisodium citrate of 30 mM. The trisodium citrate is a reductant that reduces silver. The standard electrode potential of the trisodium citrate is 0.03 V.

Next, polyvinylpyrrolidone (manufactured by Tokyo Chemical Industry Co., Ltd.) was added and mixed to the mixed liquid such that the resulting mixed liquid had a concentration of polyvinylpyrrolidone (PVP) of 20 mM (in terms of a unit molecular weight). The polyvinylpyrrolidone is a polymer adsorbent that adsorbs to the reduced silver. Note that the polyvinylpyrrolidone had been graft-polymerized to have a weight average molecular weight of 10000.

The obtained mixed liquid was irradiated with a microwave with frequency of 2.45 GHz, and heated at 130° C. for 10 minutes, thereby obtaining a dispersion liquid of the silver nanoparticles. A solid content concentration in the dispersion liquid was 10 wt %.

While 5 mL of the dispersion liquid of the silver nanoparticles was ultrasonically vibrated, silver microparticles (HXR-Ag manufactured by Nippon Atomized Metal Powders Corporation) were added, and thus, a mixed liquid was obtained. A weight of the added silver microparticles was $10^{-5}$ times the weight of silver in the silver nanoparticles in the dispersion liquid. After the ultrasonic vibration was stopped, the mixed liquid was left for one hour. The mixed liquid was separated into an upper layer and a lower layer. The mixed liquid was filtered, and the particles in the lower layer were collected.

(2) Observation of Composite Particle Structure

Figure 9:
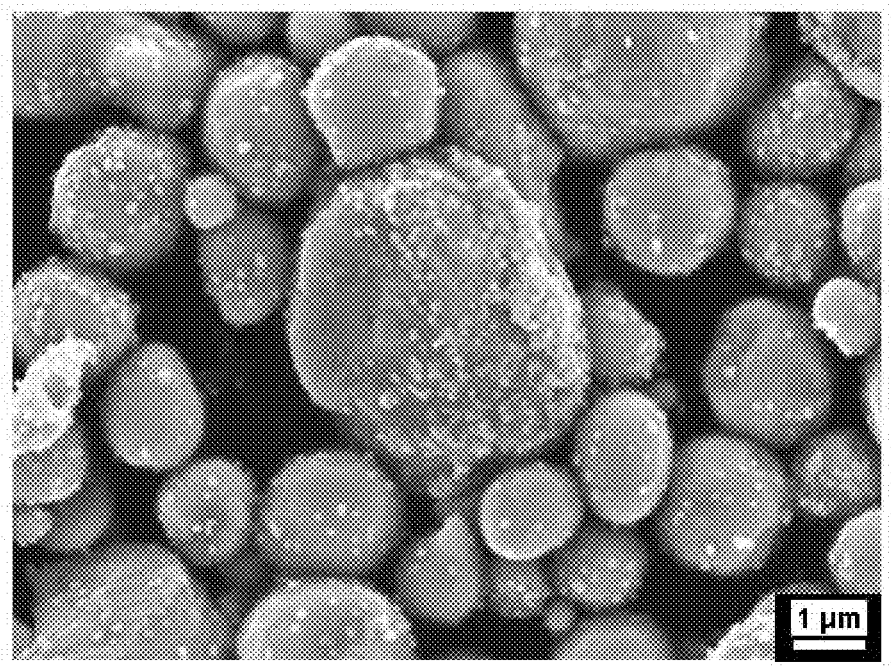
FIG. 9 is an SEM image of composite particles in Example 3.

The collected particles were observed with the SEM. FIG. 9 illustrates an SEM image of the particles. The collected particles were composite particles including silver microparticles and approximately spherical shaped silver nanoparticles adhered to surfaces of the silver microparticles as illustrated in FIG. 9.

Projected area circle equivalent diameters of randomly selected 50 silver microparticles were obtained from the SEM image of the composite particles, their sum was divided by the number of the selected particles, and thus, an average particle diameter of the silver microparticles was obtained. The average particle diameter of the silver microparticles was 2.3 μm.

Projected area circle equivalent diameters of randomly selected 50 silver nanoparticles were obtained from the SEM image of the composite particles, their sum was divided by the number of the selected particles, and thus, an average particle diameter of the silver nanoparticles was obtained. The average particle diameter of the silver nanoparticles was 10 nm as illustrated in Table 1.

A specific surface area of the composite particles was calculated from the average particle diameter of the silver microparticles and the average particle diameter of the silver nanoparticles. The calculation was performed by assuming that the silver microparticle was a spherical particle whose diameter was equal to the average particle diameter of the silver microparticles and that the silver nanoparticle was a spherical particle whose diameter was equal to the average particle diameter of the silver nanoparticles. As illustrated in Table 1, the specific surface area was 521.7 $cm^{-1}$.

Similarly to Example 1, an average crystallite diameter of the silver microparticles was obtained. The average crystallite diameter of the silver microparticles was 2.3 μm as illustrated in Table 1.

(3) Preparation of Paste

The composite particles were added in ethanol, and a mixed liquid was obtained. The ethanol was vaporized with an evaporator and the solid content concentration in the mixed liquid was adjusted to approximately 15%. The mixed liquid was added with ethylene glycol, and subsequently, the mixed liquid was heated to vaporize the ethanol, thereby obtaining a silver paste with a solid content concentration of 90%.

(4) Observation of Sintered Body Structure

Similarly to Example 1, an average crystallite diameter of the sintered body of the silver paste was obtained. The average crystallite diameter was 2.29 μm as illustrated in Table 1.

(5) Measurement of Sintered Body Extension

Similarly to Example 1, an extension of the sintered body of the silver paste was measured. The extension was 20% as illustrated in Table 1.

Comparative Example (1) Preparation of Silver Paste

In accordance with a method disclosed in JP 2018-135566 A, silver nanoparticles with an average particle diameter of 20 nm and silver microparticles with an average particle diameter of 200 nm were prepared. The silver nanoparticles, the silver microparticles, and decanol were mixed in proportion of 81:9:10 in weight ratio, and the mixed liquid was obtained. The mixed liquid was ground with the triple roll mill, thereby obtaining a silver paste with a solid content concentration of 90%. Hereinafter, the silver nanoparticles and the silver microparticles are collectively referred simply as "silver particles."

An average particle diameter, an average crystallite diameter, and a specific surface area of the silver particles in the silver paste were obtained as follows.

Projected area circle equivalent diameters of randomly selected 50 silver particles were obtained from the SEM image of the silver paste, their sum was divided by the number of the selected particles, and thus, the average particle diameter of the silver particles was obtained. The average particle diameter of the silver particles was 0.03 μm.

A specific surface area of the silver particles was calculated from the average particle diameter of the silver particles. The calculation was performed by assuming that the silver particle was a spherical particle whose diameter was equal to the average particle diameter of the silver particles. As illustrated in Table 1, the specific surface area was 100.0 cm$^{-1}$.

An EBSD measurement of cross-sectional surfaces of randomly selected 50 silver particles was performed with the SEM, and a crystal orientation map was obtained. Projected area circle equivalent diameters of crystallites in the silver particles were obtained from the crystal orientation map, their sum was divided by the number of the crystallites, and thus, an average crystallite diameter of the silver particles was obtained. The average crystallite diameter of the silver particles was 0.03 μm.

(2) Observation of Sintered Body Structure

Figure 10:
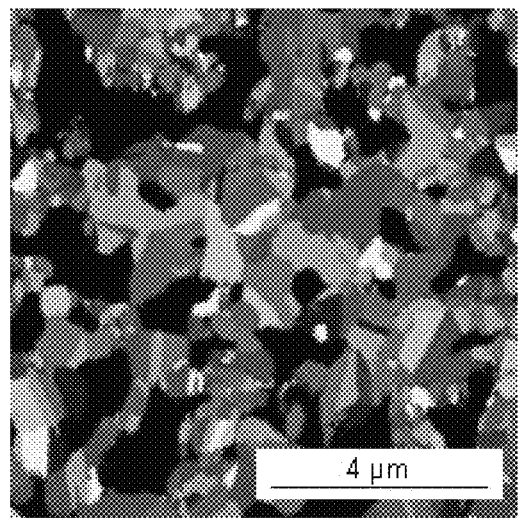
FIG. 10 is a crystal orientation map obtained by an EBSD measurement of a sintered body in Comparative Example.

Similarly to Example 1, an EBSD measurement of a sintered body of the silver paste was performed, and a crystal orientation map illustrated in FIG. 10 was obtained. An average crystallite diameter of the sintered body was obtained from the crystal orientation map similarly to Example 1. As illustrated in Table 1, the average crystallite diameter was 0.5 μm.

(3) Measurement of Sintered Body Extension

Similarly to Example 1, an extension of the sintered body of the silver paste was measured. As illustrated in Table 1, the extension was 2%.

TABLE 1

| | Before Sintering | | | After Sintering | |
|---|---|---|---|---|---|
| | Microparticle Average Crystallite Diameter [μm] | Nanoparticle Average Particle Diameter [nm] | Specific Surface Area [cm$^{-1}$] | Average Crystallite Diameter [μm] | Extension [%] |
| Example 1 | 2.3 | 10 | 260.9 | 2.27 | 19 |
| Example 2 | 2.3 | 10 | 260.9 | 1.76 | 15 |
| Example 3 | 2.3 | 10 | 521.7 | 2.29 | 20 |
| Comparative Example | | | 100.0 | 0.5 | 2 |

The sintered body in Examples 1 to 3 had larger average crystallite diameters and exhibited larger extensions than those of the sintered body in Comparative Example.

Reference Example 1

Similarly to Comparative Example, a specimen for extension measurement was manufactured. Similarly to Example 1, an extension of the specimen was measured.

An EBSD measurement of the specimen for extension measurement was performed with the SEM, and a crystal orientation map was obtained. Projected area circle equivalent diameters of randomly selected 50 crystallites were obtained from the crystal orientation map, their sum was divided by the number of the selected crystallites, and thus, an average crystallite diameter of the specimen was obtained.

Reference Example 2

A pressure of 5 MPa was applied to a specimen manufactured similarly to Reference Example 1. Next, an extension of the specimen was measured similarly to Example 1. An average crystallite diameter of the specimen after pressure application was obtained similarly to Reference Example 1.

Reference Example 3

A specimen manufactured similarly to Reference Example 1 was heated at 700° C. for one hour. Next, similarly to Example 1, an extension of the specimen was measured. Similarly to Reference Example 1, an average crystallite diameter of the specimen after heating was obtained.

Figure 11:
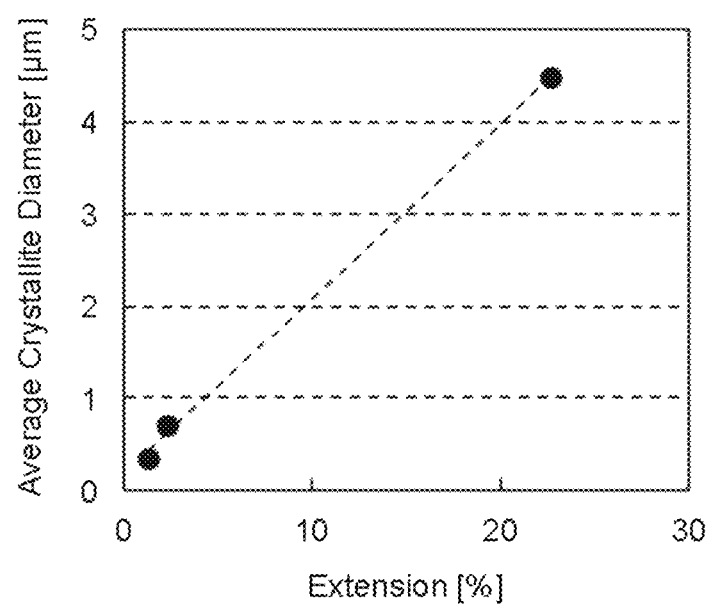
FIG. 11 is a graph showing a relation between extension and average crystallite diameter.

A graph that shows a relation between the extension and the average crystallite diameter as illustrated in FIG. 11 was obtained from the results of Reference Examples 1 to 3. It was indicated that the larger the average crystallite diameter is, the larger the extension is.

What is claimed is:

1. A sintered body obtained from composite particles, the composite particles comprising:
   microparticles having an average crystallite diameter of 0.6 to 10 μm, the microparticle containing a metal; and
   nanoparticles adhered to a surface of the microparticle, the nanoparticles having an average crystallite diameter of 3 to 100 nm, the nanoparticle containing the same metal as the metal contained in the microparticle;
   wherein the sintered body has an average crystallite diameter of 1.76 to 2.29 μm.

2. The sintered body obtained from composite particles according to claim 1,
   wherein the composite particle has a specific surface area of 1.2 to 2000 $cm^{-1}$.

3. The sintered body obtained from composite particles according to claim 1,
   wherein the nanoparticle is a spherical shaped particle.

4. The sintered body obtained from composite particles according to claim 1, wherein the composite particles have a specific surface area of 260.9 to 2000 $cm^{-1}$.

* * * * *